(12) United States Patent
Kawahito et al.

(10) Patent No.: US 8,234,636 B2
(45) Date of Patent: Jul. 31, 2012

(54) SOURCE CODE MODIFICATION TECHNIQUE

(75) Inventors: Motohiro Kawahito, Sagamihara (JP); Hideaki Komatsu, Yokohama (JP); Toshio Nakatani, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 11/530,954

(22) Filed: Sep. 12, 2006

(65) Prior Publication Data

US 2008/0127151 A1 May 29, 2008

(51) Int. Cl.
*G06F 9/45* (2006.01)

(52) U.S. Cl. ......... 717/151; 717/154; 717/157; 717/159

(58) Field of Classification Search ................... None
See application file for complete search history.

(56) References Cited

U.S. PATENT DOCUMENTS 5,966,537 A * 10/1999 Ravichandran ............... 717/158

OTHER PUBLICATIONS

Kawahito et al., Partial Redundancy Elimination for Access Expressions by Speculative Code Motion, Software Practice and Experience, Jun. 7, 2004, vol. 34, pp. 1065-1090.
Kawahito et al., Instruction Combining for Coalescing Memory Accesses Using Global Code Motion, MSP, Jun. 8, 2004.
Kawahito et al., Effective Null Pointer Check Elimination Utilizing Hardware Trap, ACM, 2000, pp. 139-149.
Bose, Interactive Program Improvement Via EAVE: An Expert Adviser for Vectorization, ACM, 1998, pp. 119-130.
Kebler, Pattern-Drive Automatic Parallelization, Data Distribution and Performance Prediction.
Park et al., Interactive Compilation and Performance Analysis With Ursa Minor.
Kebler, Applicability of Automatic Program Comprehension to Sparse Matrix Computations.
Arenaz et al., A Compiler Framework to Detect Parallelism in Irregular Codes.

* cited by examiner

*Primary Examiner* — Chuck Kendall
(74) *Attorney, Agent, or Firm* — Lieberman & Brandsdorfer, LLC (57) ABSTRACT

A modification to source code is applied in an automated manner to improve program performance while maintaining the meaning of an associated program. Source code is rewritten to improve the operation of the associated program. Prior to applying the source code optimization to the program, confirmation of approval by the programmer must be maintained. In one embodiment, the programmer is presented with numerical data pertaining to an improvement ratio associated with application of the source code optimization.

20 Claims, 8 Drawing Sheets

SOURCE CODE MODIFICATION TECHNIQUE

BACKGROUND OF THE INVENTION

1. Technical Field

This invention relates to improving efficiency of program execution. More specifically, the invention relates to optimizing source code and verification of the suggested optimization.

2. Description of the Prior Art

A compiler is a computer program or set of programs that translates text written in a source language into a target language. The original sequence is usually called the source code and the output called object code. Commonly the output has a form suitable for processing by other programs, but it may also take the form of a human readable text file. The most common reason for wanting to translate source code is to create an executable program. The name "compiler" is primarily used for programs that translate source code from a high level language to a lower level language. A compiler is likely to perform many or all of the following operations: lexing, preprocessing, parsing, semantic analysis, code optimizations, and code generation.

It is known in the art to improve compiler performance by rewriting instructions in source code to replace a sequence of instructions. This technique is known in the art as optimization. When an optimization of a compiled code is applied, the meaning of the program must be maintained. The intention of combining instructions is to yield the same results with a fewer number of machine cycles, thereby improving execution efficiency.

There are two broad categories of optimization tools. The first category is a tool to apply changes to the source code that changes the meaning of the program, and the second category is a tool that rewrites source code without changing the meaning of a program. However, there are limitations associated with both the first and second category of tools in the prior art, including, limiting the quantity of specific candidates for modification as well as limiting a select category of source code instructions.

Therefore, there is a need for an optimization technique that modifies source code that is not limited to loop transformations. A technique that resolves the shortcomings of the prior art should improve performance by displaying the location of a suggested change in the source code together with candidates within the source code subject to modification.

SUMMARY OF THE INVENTION

This invention comprises a method and system for optimizing source code to improve operating efficiency of a program.

In one aspect of the invention, a method is provided for optimizing source code by applying a first optimization technique to a select set of source code of the program based on regular conditions, and applying a second optimization technique to the select set of source code of the program based on application of assumptive conditions. The first optimization technique is compared with the second optimization technique to determine which optimization technique yields improved efficiency in source code execution. A programmer selects one of the optimization techniques. Upon a selecting of one of the optimization techniques in response to said comparison, the source code is transformed in line with the selected optimization technique. The step of transforming said source code affects the program by either changing the expression of the program or maintaining the expression of the program.

In another aspect of the invention, an article is provided with a computer-readable medium having computer useable program code for optimizing source code. The computer readable program, when executed on a computer, causes the computer to apply a first optimization technique to a select set of source code of the program based on regular conditions, and to apply a second optimization technique to the select set source code of said program based on application of assumptive conditions. The program then compares the first optimization technique of the select source code with the second optimization technique to determine which optimization technique yields improved efficiency in source code execution. A programmer selects one of the optimization techniques. Transformation of the source affects the program by either changing the expression of the program or maintaining the expression of the program.

In yet another aspect of the invention, a computer system is provided with a tool to optimize source code. The tool provides instructions to apply a first optimization technique to a select set of source code based on regular conditions, and to apply a second optimization technique to the select set of source code based on application of assumptive conditions. A manager within the tool compares the first optimization technique of the select source code with the second optimization technique to determine which optimization technique yields improved efficiency in source code execution. A programmer selects one of the optimization techniques. The manager executes instructions to transform the source code based upon a selection of one of the optimization techniques in response to the comparison. Transformation of the source code either changes the expression of the program, or maintains the expression of the program.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A source code optimization tool may apply changes to the source code to improve compiler performance. Where an optimization to the source code has been applied and failed, a tool is employed to store associated modification data. Such data may include, data pertaining to the cause of the failure, a solution to the failure, a determination as to whether a modified optimization has been successfully applied, and any performance improvement ratio. The tool may also be employed to display the location in the source code where the optimization failed. Queries are sent to a programmer through the tool to seek approval for such modifications and changes thereto.

Technical Details

The source code optimization tool focuses on changing source code under a category of regular conditions, also known as conditions in which no assumptions are made to the source code, and a category of assumptions applied to the source code. Under both categories, the changes made to the source code changes the meaning of the program. The location of the change(s) in the source code is displayed to the programmer together with the elements to be changed. In one embodiment, the display of the change(s) in the source code may be output to a console, highlighted within the code, or placed in a pop-up window.

As noted above, the optimization tool may operate under assumptive conditions. The following is a list of optimizations and associated assumptions:
1. Movement of a command that causes an exception to the outside of a DO LOOP. When applying this movement command, assume that there is no problem even if the movement is made by ignoring commands involving side effects, such as a command that may cause another type of exception and a command to write into memory.
2. Movement of a load command to the outside of a loop. When applying this optimization, assume access is always valid, there is no alias of memory at all times, and there is no writing into the same memory region within a method call.
3. Movement of a store command to the outside of a loop. When applying this optimization, assume an exception checking command located on the path to the outside of a loop does not cause an exception at all times, there is no alias of memory at all times, and there is no access to the same memory region within a method call.
4. Coalesce a plurality of load commands into one command. When applying this optimization, assume alignment of all effective addresses of the same type of load commands for the same base address.
5. When applying optimizations for memory access, assume that field values do not change. In this case, a suggestion is made to the programmer to attach a final attribute to the field.
6. When applying optimizations for classes, assume that classes never have any subclasses. In this case, a suggestion is made to the programmer to attach a final attribute to the class.
7. When applying optimizations for methods, assume that methods are not overwritten. In this case, a suggestion is made to the programmer to attach a final attribute to the method.

As described above, the above listed assumptions are combinations of targeted optimization techniques and associated assumption condition. In one embodiment, a programmer may select one or more combinations from the list of optimization and assumption conditions.

Figure 1:
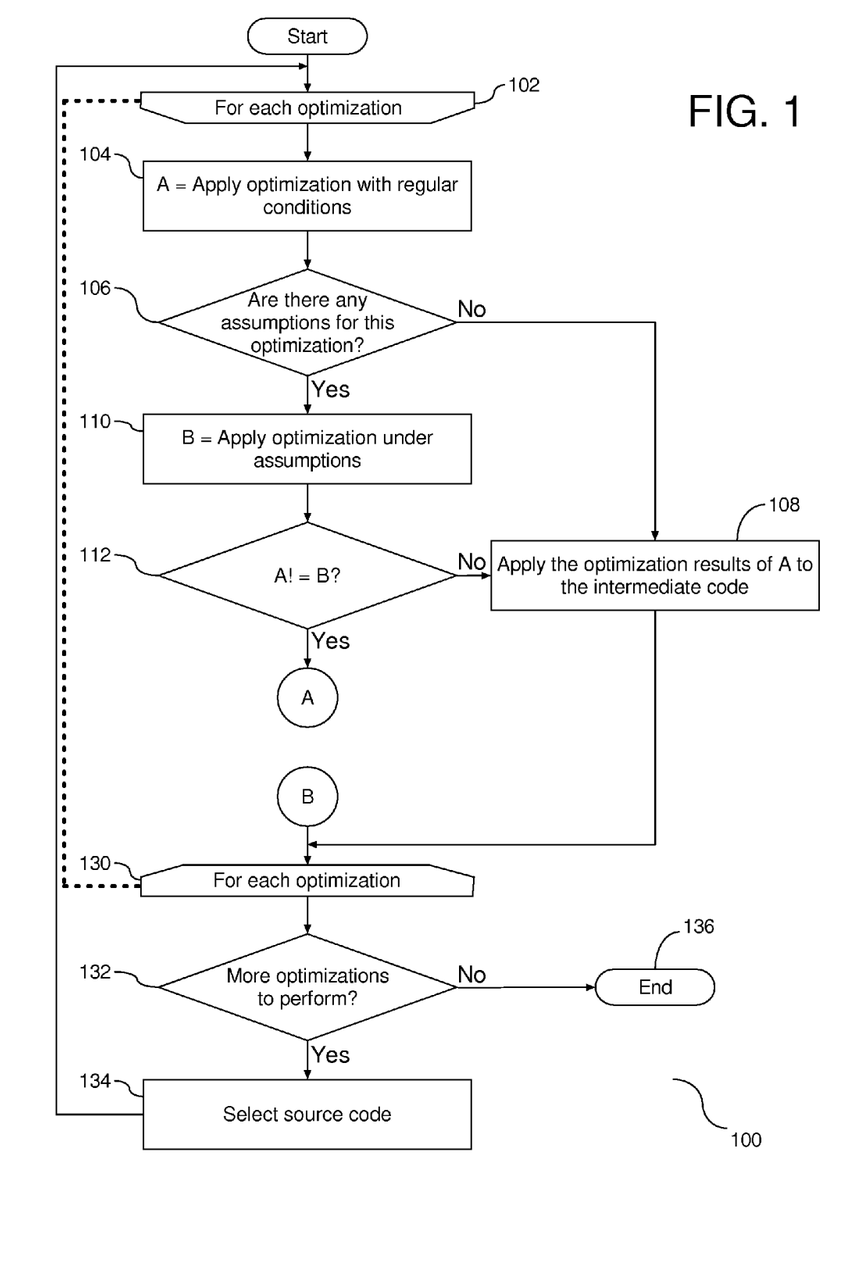
FIGS. 1 and 2 are flow charts illustrating the process invoked by the source code optimization tool to apply changes to the source code.
Figure 2:
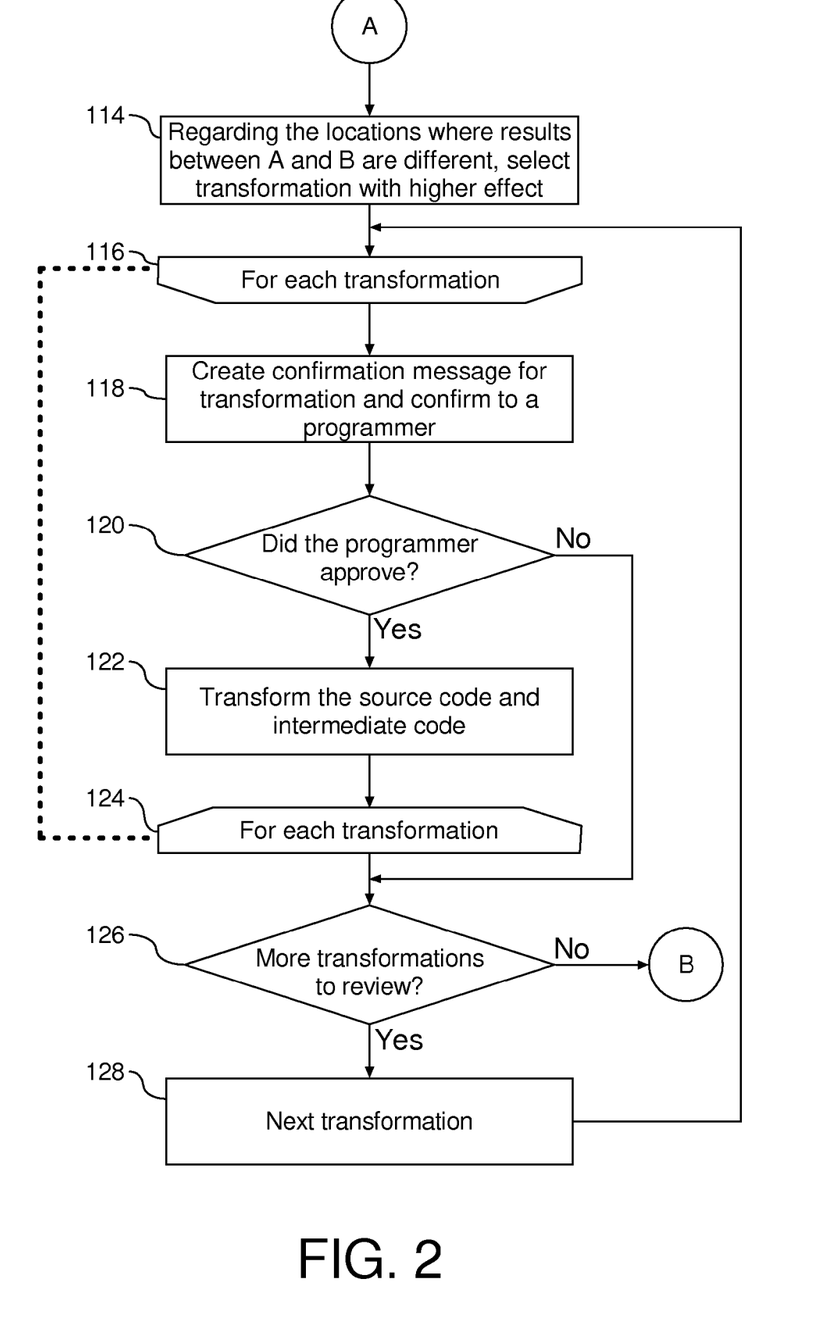

FIGS. 1 and 2 are a flow chart (100) illustrating the process invoked by the source code optimization tool to apply changes to the source code. There are two general categories of optimizations, under regular conditions, i.e. without applying any assumptive conditions to the optimization technique, and under certain assumptions. For each optimization (102), the result of applying optimization of the source code under regular conditions is assigned to the variable A (104). A determination is made as to whether there are any assumptions for this optimization (106), i.e. the optimization assigned to A. If the response to the determination at step (106) is negative, this is an indication that the optimization tool will operate under regular conditions and the changes from the optimization at step (104) are applied to an intermediate code (108). An intermediate language is the language of an abstract machine designed to aid in the analysis of computer programs. The term comes from their use in compilers, where a compiler first translates the source code of a program into a form more suitable for code-improving transformations, as an intermediate step before generating object or machine code for a target machine. If the response to the determination at step (106) is positive, this is an indication that the optimization tool will proceed with optimizing the source code based on the assumptions listed above. The result of applying optimization of the source code optimization under specified assumptions is assigned to the variable B (110). Following the assignment at step (110), results of applying the optimization techniques at steps (104) and (110) are compared to determine whether the results of the separate techniques yield different results (112). A negative determination returns to step (108) so that the tool may apply the optimization results to an intermediate source code (108). Accordingly, if the optimization results of the source code based upon regular conditions and assumptive conditions is equivalent, input from a programmer for approval of the optimization is not required.

However, a positive determine at step (112) results in determining the improvement in the source code based on a comparison of the changes proposed by the regular conditions and the changes proposed based on the assumed conditions, and selecting the transformation of the source code with the higher effect (114). For each transformation of source code (116), a confirmation message is created to confirm the transformation of the source code with a programmer (118). Thereafter, a determination is made as to whether the programmer has approved the transformation of the source code (120). A positive determination at step (120) will transform the source code and intermediate code (122). Accordingly, steps (118) through (122) are processed for each transformation of source code (124).

A negative determination at step (120) will proceed to step (126) to determine if there are more transformations to be reviewed. If it is determined that there are more transformations to be reviewed, the next transformation is presented to the programmer (128) and the process returns to step (116) for presentation to the programmer. However, if the response to the results of the determination at step (126) confirms that there is no more transformation to present to the programmer, for each optimization (130) a subsequent determination is conducted to determine if there is more source code to be optimized (132). A positive response to the determination at step (132) will follow with a selection of source code for optimization (130), followed by a return to step (102). However, a negative response to the determination at step (132) is an indication that there is no more source code and the process concludes (136). The steps outlined above outlines the process of optimizing the source code and select a transformation with a higher effect. If the transformation of the source code at step (110) is selected, each transformation is reviewed by the programmer, as shown at steps (116)-(124).

In some cases the optimization of the source code is applied and fails. Information pertaining to the failure is conveyed to the programmer so that the programmer may correct the error in the modified source code. Failure information may include cause and location of the failure, and how the source code may be rewritten to overcome the failure. At such time as the optimization is successful, an improvement ratio of the performance between the original source code and the modified source code is stored in memory. In one embodiment, an exception list is created from proposed changes to the source code that was not approved by the programmer. To avoid repetition of prior decisions pertaining to source code optimization, the programmer may view the proposed change and compare the proposal to previously negated changes on the exception list.

Figure 3:
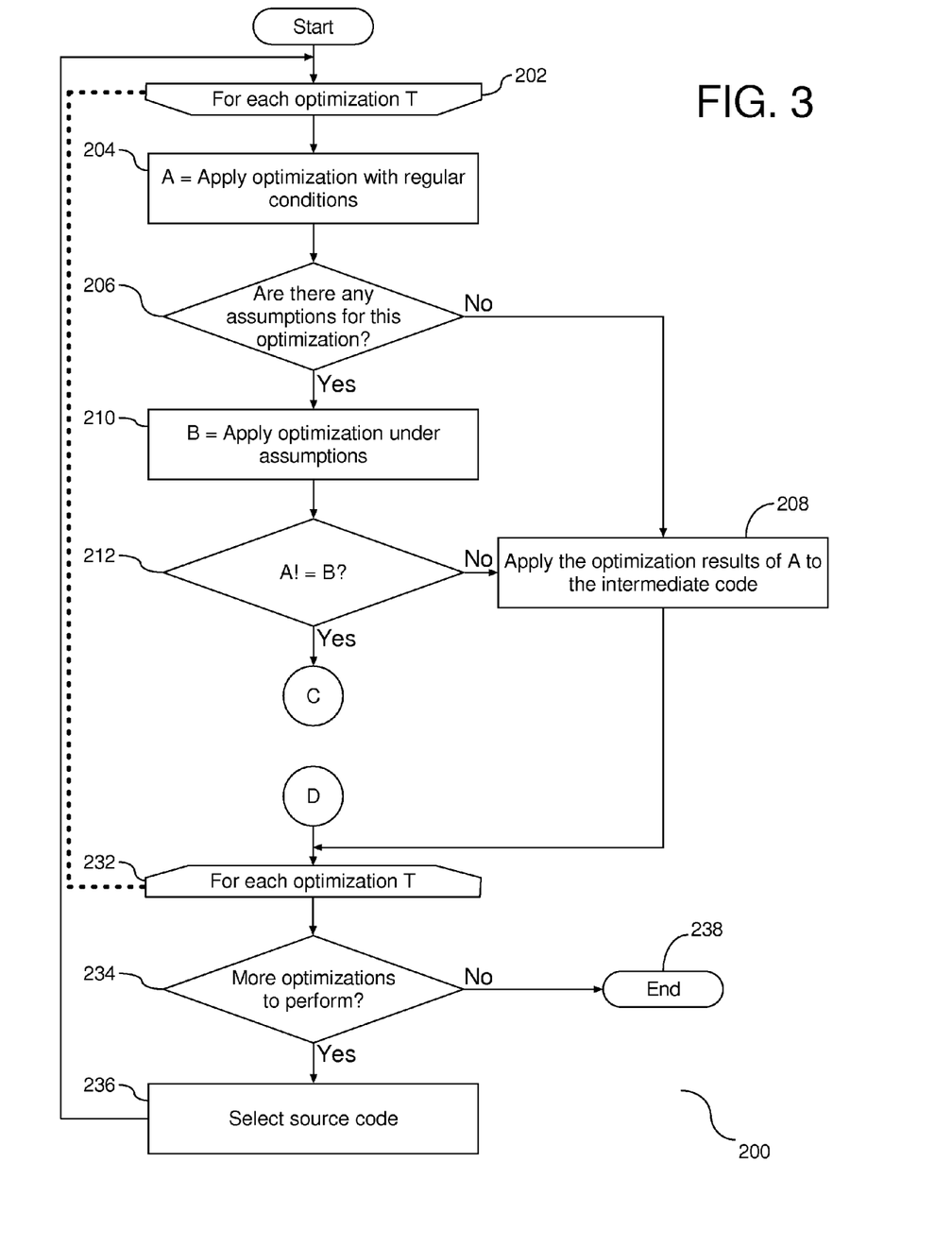
FIGS. 3 and 4 are flow charts illustrating a process for creating an optimization dependence graph according to the preferred embodiment of this invention, and are suggested for printing on the first page of the issued patent.
Figure 4:
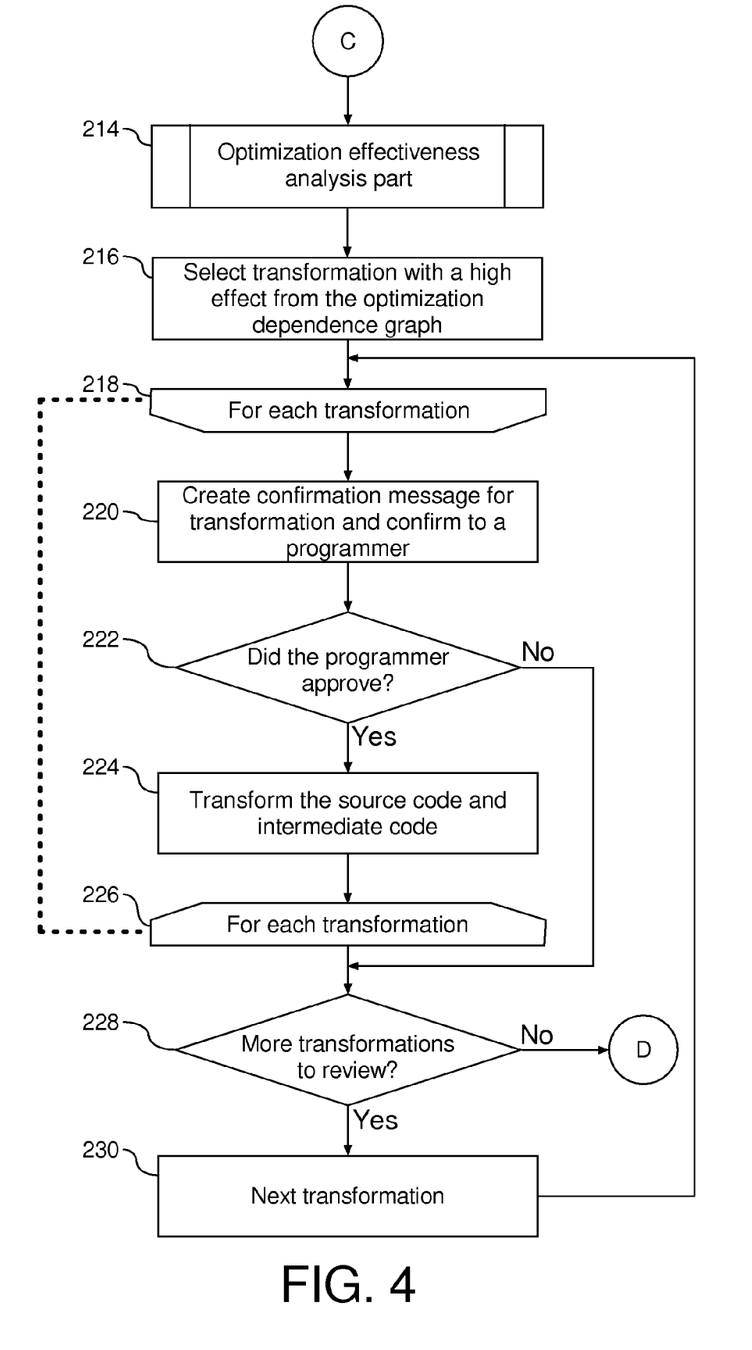
Figure 5A:
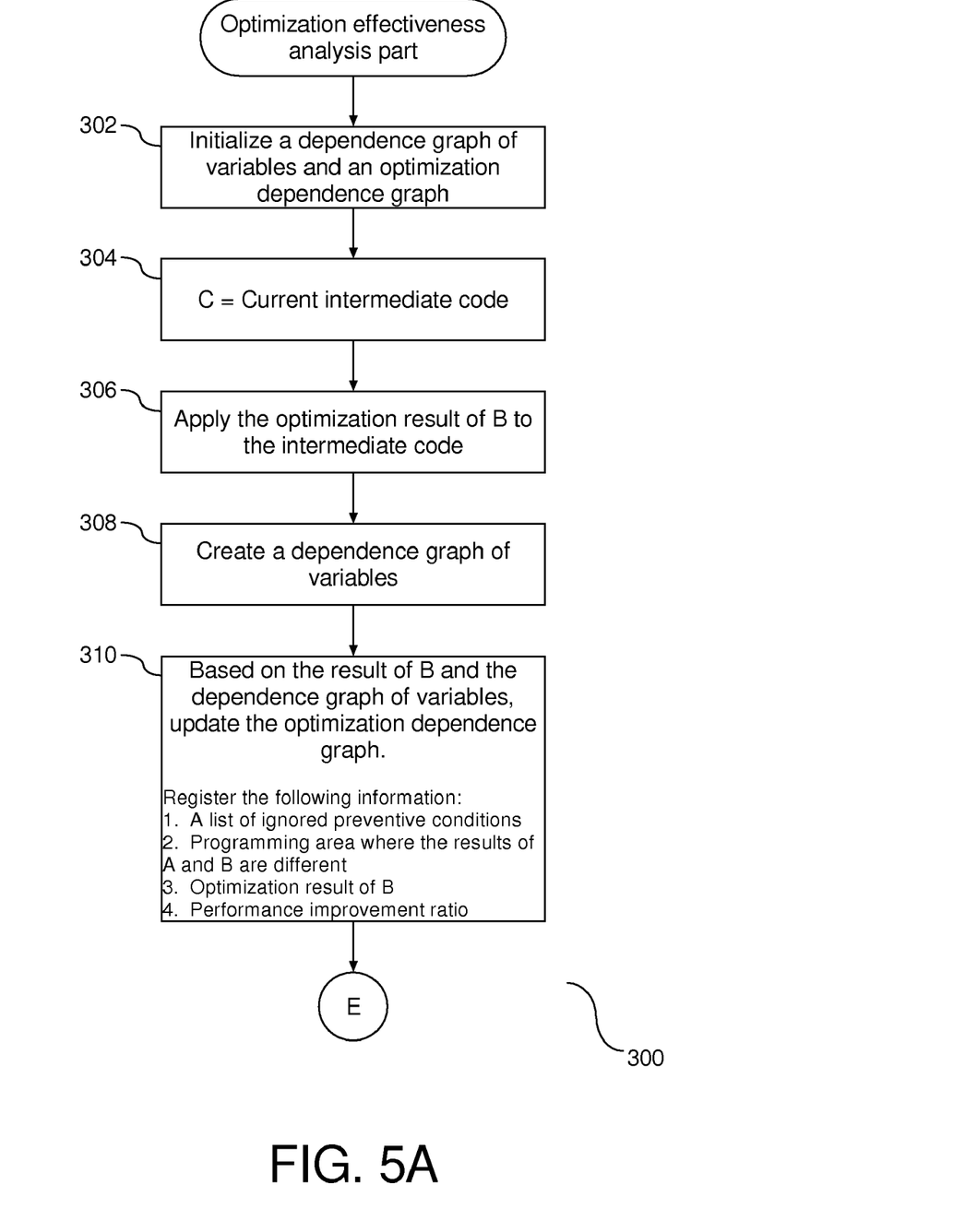
FIGS. 5a and 5b are flow charts illustrating analysis and comparison of the optimization options that yields creation of an optimization dependency graph.

In addition to determining an optimal change to the source code, as shown in FIGS. 1 and 2, an optimization graph is created to illustrate estimation of the optimization effect. In one embodiment, the optimization graph may be in the form of a dependence graph in the form of a directed graph that represents the control flow of program code. The graph includes a plurality of nodes and a directed edge. Each node represents a straight line sequence of code that can be entered only at the beginning and exited only at the end, i.e. a basic block. A directed edge is a control flow from one basic block to another basic block. Edges represent the control flow from the one basic block to one or more subsequent blocks. FIGS. 3 and 4 are a flow chart (200) illustrating a process for creating an optimization dependence graph. As in FIGS. 1 and 2, there are two general categories of optimization, under regular conditions, and under certain assumptions. For each optimization (202), the result of applying optimization of the source code under regular conditions is assigned to the variable A (204). A determination is made as to whether there are any assumptions for this optimization (206), i.e. the optimization assigned to A. If the response to the determination at step (206) is negative, this is an indication that the optimization tool will operate under regular conditions and the changes to the source code under regular conditions will be applied to the source code and retained in an intermediate code (208). However, if the response to the determination at step (206) is positive, this is an indication that the optimization tool may operate under specified assumptions. The result of applying optimization of the source code under specified assumptions is assigned to the variable B (210). Following the assignment at step (210), results of applying the optimization techniques at steps (204) and (210) are compared to determine whether the results of the separate techniques yield different results (212). A negative determination returns to step (208) so that the changes to the source code under regular conditions may be applied to an intermediate form of the source code (208). However, a positive determine at step (212) results in analyzing the effectiveness between the two optimization methods and storing the effectiveness in memory (214), e.g. analysis of effectiveness of source code optimization under regular conditions as compared to effectiveness of source code optimization under specified assumptions. Details of the optimization analysis are shown in FIG. 5A and described in detail below.

Following step (214), the transformation of the source code with the higher effect is selected (216). In one embodiment, the higher effect source code may be as determined through a dependence graph. For each transformation of source code (218), a confirmation message is created to confirm the transformation of the source code with a programmer (220). Thereafter, a determination is made as to whether the programmer has approved the transformation of the source code (222). A positive determination at step (222) will transform the source code and intermediate code (224). Accordingly, steps (218) through (224) are processed for each transformation of source code (226).

A negative determination at step (222) will proceed to step (228) to determine if there are more transformations to be reviewed. If it is determined that there are more transformations to be reviewed, the next transformation is presented to the programmer (230) and the process returns to step (218) for presentation to the programmer. However, if the response to the results of the determination at step (228) confirms that there are no more transformations to present to the programmer, for each optimization (232) a subsequent determination is conducted to determine if there is more source code to be optimized (234). A positive response to the determination at step (234) will follow with a selection of source code for optimization (236), followed by a return to step (202). However, a negative response to the determination at step (234) is an indication that there is no more source code and the process concludes (238).

Accordingly, in the embodiment illustrated in FIGS. 3 and 4, a comparison of the effects of the two optimization methods is compared and the optimization method with the optimal effect is selected for transformation.

Figure 5B:
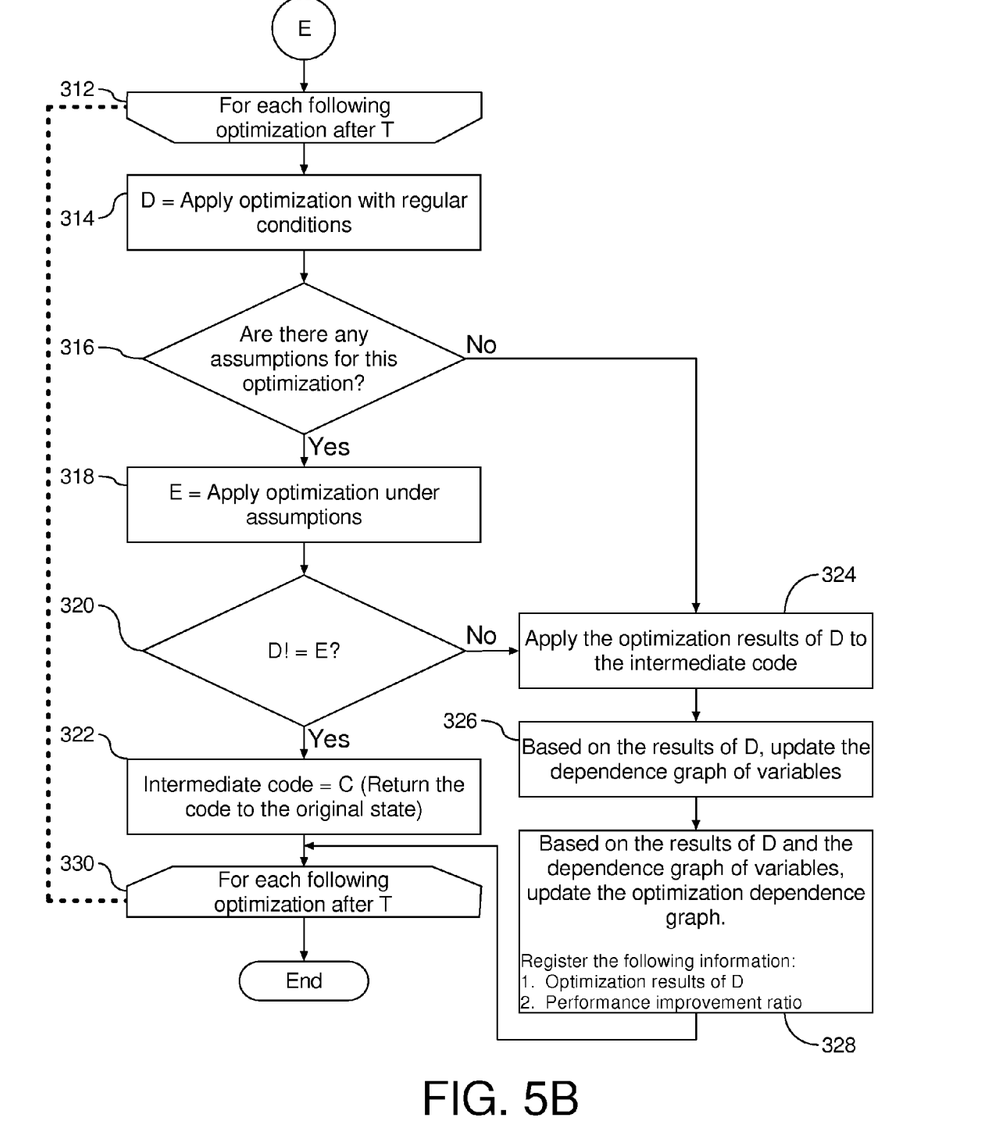

As noted above, analysis of the two optimization methods is conducted in order to determine which method yields optimal results. In one embodiment, part of this analysis includes creation of a dependency graph based upon analysis of different optimization options available. FIGS. 5A and 5B are a flow chart (300) illustrating analysis and comparison of the optimization options that yields creation of an optimization dependency graph. As shown in FIGS. 3 and 4, this analysis is conducted based upon application of assumptive conditions to the source code optimization at step (210) followed by a determination that the source code optimization under regular conditions yields different results than source code optimization under assumptive conditions. A dependence graph of variables and an optimization dependence graph are initialized (302). The current intermediate source code is assigned to the variable C (304), i.e. intermediate code. Thereafter, the optimization under assumption(s) is applied to the intermediate code (306), and a dependence graph of variables based on the result of the optimization under assumption(s) is created (308). The following information is registered: a list of ignored preventive conditions, programming area where the results of A and B are different, optimization result of B, and the performance improvement ratio, if any (310). For each subsequent optimization to the source code (312), the results of applying the optimization of the source code under regular conditions is assigned the variable D (314), and a determination is made as to whether there are any assumptions for this optimization (316). If the response to the determination at step (316) is positive, the result of applying optimization of the source code optimization under specified assumptions is assigned to the variable E (318), and a subsequent determination is made as to whether the optimization under regular conditions does not yield the same results as optimization under assumed conditions (320). A positive response to the determination at step (320) results in returning the source code from the intermediate source code to the original source code (322) from step (304). However, a negative response to the determinations at steps (316) or (320), results in applying the optimization results of the regular conditions to the intermediate source code (324). Based on the results of application of the source code optimization at step (324), the dependence graph variables are updated (326). Thereafter, the optimization dependence graph is updated to register the optimization result(s) from step (326) and the performance improvement ratio associated therewith (328). Following step (328), the process returns to step (312) to process any remaining source code optimizations (330). Upon a determination that analysis of the source code optimization is complete, the analysis is complete and the process returns to step (216) to select a source code optimization technique that yields the highest result(s).

As show in FIGS. 5A and 5B, in addition to optimizing source code, a graph is created to express the dependence relationships between different optimization techniques. In one embodiment, the node in the dependence graph represents how a command is transformed. Each node in the graph has an improvement ratio. Each edge between the nodes means that movement to the next node is allowed if the transformation of the previous node has been achieved. As noted above, the effectiveness of optimization between two optimizations is recorded.

Figure 6:
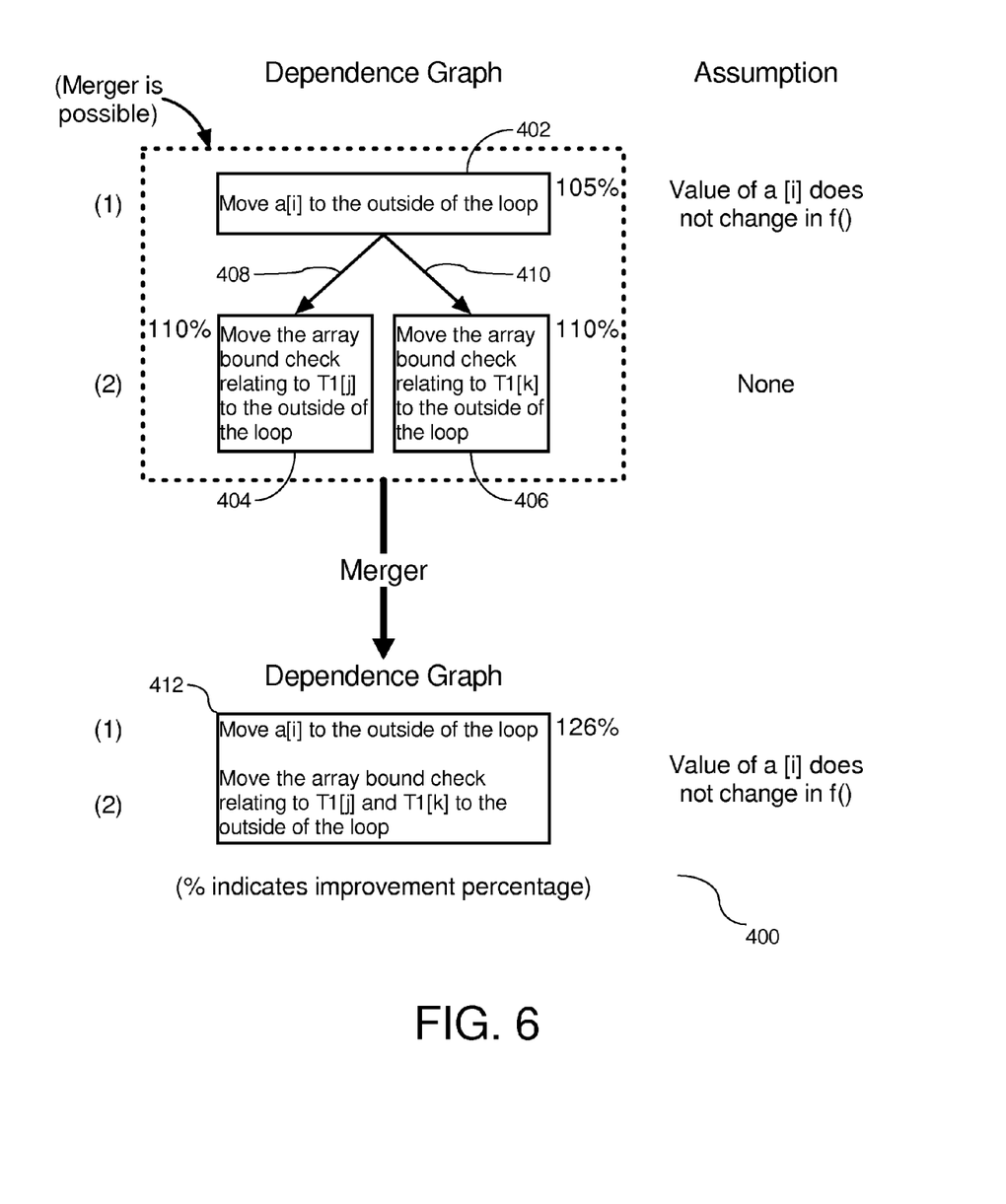
FIG. 6 is an example of a dependence graph associated with the optimization technique(s).
Figure 7:
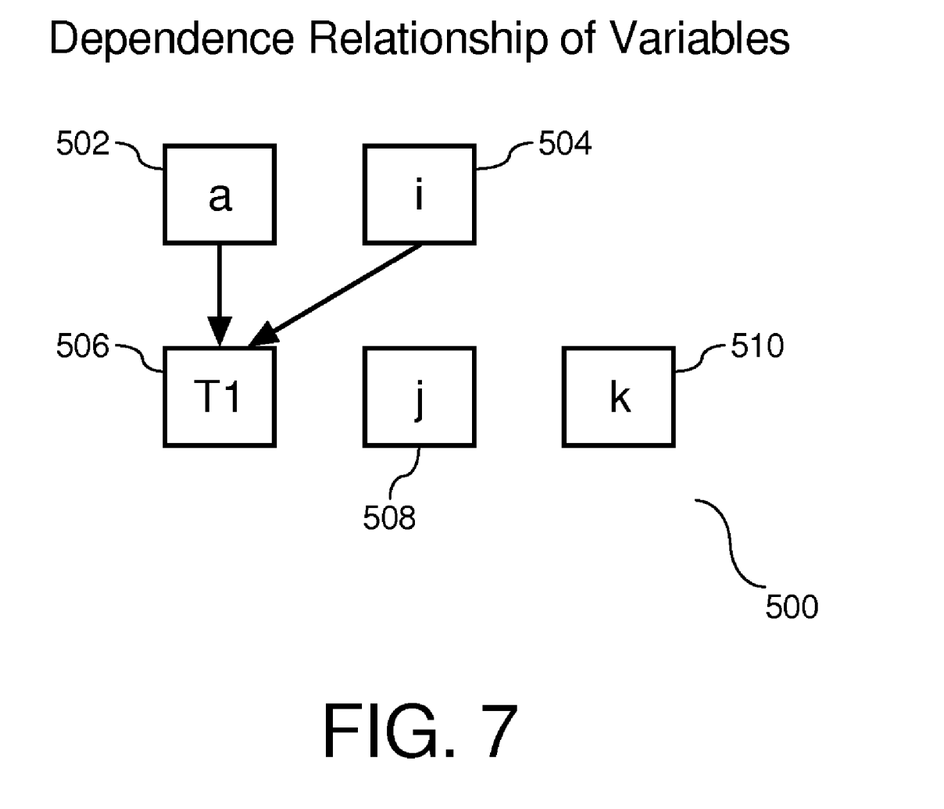
FIG. 7 is a block diagram of a dependency graph showing the relationship of the variables of the graph in FIG. 6.

FIG. 6 is an example of a dependence graph (400). As shown, there are three nodes (402), (404), and (406), and two edges (408) and (410). Node (402) represents an intermediate representation of source code with a memory load optimization assuming memory values are not modified in a subsequent function call. Nodes (404) and (406) represent application of an array boundary check with no assumptions applied. When a dependence graph is created, there is a need to examine the dependence between optimizations. If there is no dependence relationship between expressions for each optimization, each expression is represented as independent. Similarly, if there is a dependence relationship between the expressions to be optimized, they are represented as edges. If there is no dependence relationship between expressions for each optimization, then each expression is represented as independent. However, if there is a dependence relationship between expressions for each optimization, then each expression is represented as dependent. If the number of edges that flow into a node in the graph is one and there is no assumption in the node, the node can be combined with the previous node. As shown herein at node (412), a merger of nodes (404) and (406) is possible with an improvement percentage of 126 percent. FIG. 7 is a block diagram (500) of a dependency graph showing the relationship of the variables of the graph in FIG. 6. As shown, there are two variables (502) and (504) that may merge to form an array (506) based on the variables (508) and (510). This graph (500) shows that the array in (506) is created based on the variables in (502) and (504). In this dependence graph, if the number of edges that flow into a node is one and there is no assumption on the node, then the node can be combined with the previous node. The improvement percentage of such a combination is calculated as follows:

(improvement percentage of the following nodes)*
(improvement percentage of previous node)

In one embodiment, following the above calculation, an estimation of the effectiveness of the optimizations is presented to the programmer. Accordingly, a programmer may determine selection of an optimization technique based upon the improvement percentage associated with the relationship of the nodes in a dependence graph.

To improve the effectiveness of optimization, a plurality of load commands is coalesced into a single load command. Memory accesses whose effective addresses were originally aligned are considered as a group, and code motion is carried out so that as many memory access belonging to a group is collected in one location. Therefore, it is possible to calculate which memories should be aligning to obtain effectiveness based on the execution frequency and to present the calculation result to the programmer.

The invention can take the form of a hardware embodiment, a software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Advantages Over the Prior Art

A method and tool for optimizing source code is provided in a manner that both educates the programmer on improved performance associated with the optimization, and solicits confirmation from the programmer prior to acceptance of the changes. Program patterns and methods for optimizing source code associated with such patterns may be predefined. Similarly, certain conditions may yield assumptions, and such assumptions can be applied to the source code optimization. The performance improvement of the program associated with suggested changes in the optimization are presented to the program based upon two techniques, with a selection of one of the techniques provided as an option for the programmer.

ALTERNATIVE EMBODIMENTS

It will be appreciated that, although specific embodiments of the invention have been described herein for purposes of illustration, various modifications may be made without departing from the spirit and scope of the invention. In particular, source code optimization may include one or more assumptive conditions. However, there is no need to apply all of the assumptive condition. Rather, a programmer may select which conditions to apply from a list of assumptive conditions. In addition, in one embodiment, the programmer may create their own assumptive conditions to be applied. Accordingly, the scope of protection of this invention is limited only by the following claims and their equivalents.

We claim:

1. A method for optimizing source code of a program, comprising:
   applying a first optimization technique to a select set source code of said program based on regular conditions;
   applying a second optimization technique to said select set source code of said program based on application of an assumptive condition, said applied second optimization technique changing a meaning of the program, said assumptive condition including movement of a command outside of a loop within the program;
   comparing said first optimization technique of said select source code with said second optimization technique to determine which optimization technique yields improved efficiency in source code execution, wherein selection of one of said optimization techniques yields approval from a programmer; and
   selecting of one of said optimization techniques in response to said comparison; and
   transforming said source code based upon said selection, wherein the step of transforming said source code includes an affect on said program.

2. The method of claim 1, wherein the step of transforming said source code is automatic following selection of one of said optimization techniques.

3. The method of claim 1, wherein said second optimization technique includes coalescing a plurality of load commands into a single load command.

4. The method of claim 1, further comprising creating a dependence graph for said first and second optimization techniques to express dependence relationships between said optimization techniques.

5. The method of claim 1, further comprising registering disapproved source code changes in an exception list.

6. The method of claim 1, further comprising predefining source code patterns and modifying source code having a pattern similar to one of said predefined source code patterns following approval of said modification.

7. The method of claim 1, wherein said assumptive conditions are selected from the group consisting of ignore preventive conditions, attach a final attribute in locations where classes, methods, or fields are recognized as not having been written, attach a final attribute where a class does not have a subclass, attach a final attribute where a method has not been overridden, and attach a final attribute where a field has not been modified.

8. An article comprising:
   a computer-readable storage medium having computer useable program code for optimizing source code, wherein the computer readable program when executed on a computer causes the computer to:
      apply a first optimization technique to a select set of source code of said program based on regular conditions;
      apply a second optimization technique to said select set source code of said program based on application of at least one assumptive conditions changing a meaning of the program, said assumptive condition including movement of a command outside of a loop within the program;
      compare said first optimization technique of said select source code with said second optimization technique of said select source code to determine which optimization technique yields improved efficiency in source code execution, wherein selection of one of said optimization technique yields approval from a programmer; and
      transform said source code based upon a selection of one of said optimization techniques in response to said comparison, wherein transformation of said source code includes an affect on said program.

9. The article of claim 8, wherein transformation of said source code is automatic after selection of one of said optimization techniques.

10. The article of claim 8, wherein said second optimization technique includes instructions to coalesce a plurality of load commands into a single load command.

11. The article of claim 8, further comprising instructions in said program to create a dependence graph for said first and second optimization techniques to express dependence relationships between said optimization techniques.

12. The article of claim 8, further comprising instructions in said program to register disapproved source code changes in an exception list.

13. The article of claim 8, further comprising instructions in said program to predefine source code patterns and to modify source code having a pattern similar to one of said predefined source code patterns after approval of said modification.

14. The article of claim 8, wherein said assumptive conditions are selected from the group consisting of ignore preventive conditions, attach a final attribute in locations where classes, methods, or fields are recognized as not having been written, attach a final attribute where a class does not have a subclass, attach a final attribute where a method has not been overridden, and attach a final attribute where a field has not been modified.

15. A computer system comprising a processor in communication with a tool to optimize source code, comprising:
   a first optimization technique applied to a select set source code based on regular conditions;
   a second optimization technique applied to said select set source code based on application of at least one assumptive conditions, said applied second optimization technique changing a meaning of the program, said assumptive condition including movement of a command outside of a loop within the program;
   a manager within said tool to compare said first optimization technique of said select source code with said second optimization technique to determine which optimization technique yields improved efficiency in source code execution, wherein selection of one of said optimization technique yields approval from a programmer; and
   said manager to execute instructions to select to transform said source code based upon a selection of one of said optimization techniques in response to said comparison, wherein transformation of said source code includes an affect on said program.

16. The system of claim 15, wherein transformation of said source code is automatic following selection of one of said optimization techniques.

17. The system of claim 15, wherein said second optimization technique includes instructions to coalesce a plurality of load commands into a single load command.

18. The system of claim 15, further comprising separate dependence graphs created by said manager for said first and second optimization techniques to express dependence relationships between said optimization techniques, and a technique to merge nodes of said dependence graphs.

19. The system of claim 15, wherein said assumptive conditions are selected from the group consisting of ignore preventive conditions, attach a final attribute in locations where classes, methods, or fields are recognized as not having been written, attach a final attribute where a class does not have a subclass, attach a final attribute where a method has not been overridden, and attach a final attribute where a field has not been modified.

20. The system of claim 15, further comprising a predefined source code pattern and said manager to modify source code having a pattern similar to said predefined source code pattern after approval of said modification.

* * * * *